US006869277B2

(12) United States Patent
Stephens

(10) Patent No.: US 6,869,277 B2
(45) Date of Patent: *Mar. 22, 2005

(54) BURNER EMPLOYING COOLED FLUE GAS RECIRCULATION

(75) Inventor: George Stephens, Humble, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 133 days.

This patent is subject to a terminal disclaimer.

(21) Appl. No.: 10/388,961

(22) Filed: Mar. 14, 2003

(65) Prior Publication Data

US 2003/0175637 A1 Sep. 18, 2003

Related U.S. Application Data

(60) Provisional application No. 60/365,146, filed on Mar. 16, 2002.

(51) Int. Cl.[7] .................................................. F23M 3/00
(52) U.S. Cl. ........................ 431/9; 431/115; 126/91 A
(58) Field of Search ............................... 431/9, 5, 115, 431/215; 126/91 A

(56) References Cited

U.S. PATENT DOCUMENTS

| 2,368,370 A | 1/1945 | Maxon |
| 2,813,578 A | 11/1957 | Ferguson |
| 2,918,117 A | 12/1959 | Griffin |

(List continued on next page.)

FOREIGN PATENT DOCUMENTS

| CA | 1169753 | 6/1984 |
| DE | 2944153 | 5/1981 |
| DE | 3232421 | 3/1984 |
| DE | 3818265 | 11/1989 |
| EP | 0099828 | 6/1988 |
| EP | 0 347 956 | 12/1989 |
| EP | 0 374 423 | 6/1990 |
| EP | 0 408 171 A1 | 1/1991 |
| EP | 0 620 402 A1 | 10/1994 |
| EP | 0 674 135 B2 | 9/1995 |
| EP | 0 751 343 | 1/1997 |
| EP | 0486169 | 1/1998 |
| EP | 1096202 | 2/2001 |
| FR | 2629900 | 10/1988 |
| SU | 374488 | 5/1970 |

OTHER PUBLICATIONS

Straitz III, John F., et al., "Combat NOx With Better Burner Design," *Chemical Engineering*, Nov. 1994, pp. EE–4–EE–8.

Vahdati, M. M., et al., "Design And Development of A Low NOx Coanda Ejector Burner," *Journal of the Institute of Energy*, Mar. 2000, vol. 73, pp. 12–17.

Bussman, Wes, et al., "Low NOx Burner Technology for Ethylene Cracking Furnaces," presented at the *2001 AIChE Spring National Meeting, 13th Annual Ethylene Producers Conference*, Houston, TX, Apr. 25, 2001, pp. 1–23.

(List continued on next page.)

*Primary Examiner*—Alfred Basichas
(74) *Attorney, Agent, or Firm*—Lucinda Lomas

(57) ABSTRACT

A method and apparatus for use in burners of furnaces such as those used in steam cracking. The apparatus includes a burner tube having a burner tip mounted on the downstream end of the burner tube adjacent to a first opening in the furnace, so that combustion of the fuel takes place downstream of the burner tip. At least one passageway from a second opening in the furnace ending adjacent to the upstream end of the burner tube is provided. Also provided is a means for drawing flue gas from the furnace through the passageway in response to an inspirating effect created by uncombusted fuel flowing through the burner tube. At least one heat exchange tube disposed in the passageway wherein air that is cooler than the flue gas flows through the heat exchange tube into a secondary air chamber permitting heat to be transferred from the flue gas to the air to create preheated air.

33 Claims, 9 Drawing Sheets

U.S. PATENT DOCUMENTS

| | | |
|---|---|---|
| 2,983,312 A | 5/1961 | Finley et al. |
| 3,880,570 A | 4/1975 | Marshall |
| 4,004,875 A | 1/1977 | Zink et al. |
| 4,089,629 A | 5/1978 | Baumgartner et al. |
| 4,130,388 A | 12/1978 | Flanagan |
| 4,230,445 A | 10/1980 | Janssen |
| 4,257,763 A | 3/1981 | Reed |
| 4,575,332 A | 3/1986 | Oppenberg et al. |
| 4,629,413 A | 12/1986 | Michelson et al. |
| 4,708,638 A | 11/1987 | Brazier et al. |
| 4,739,713 A | 4/1988 | Vier et al. |
| 4,748,919 A | 6/1988 | Campobenedetto et al. |
| 4,815,966 A | 3/1989 | Janssen |
| 4,828,483 A | 5/1989 | Finke |
| 4,963,089 A | 10/1990 | Spielman |
| 4,995,807 A | 2/1991 | Rampley et al. |
| 5,044,931 A | 9/1991 | Van Eerden et al. |
| 5,073,105 A | 12/1991 | Martin et al. |
| 5,092,761 A | 3/1992 | Dinocolantonio |
| 5,098,282 A | 3/1992 | Schwartz et al. |
| 5,135,387 A | 8/1992 | Martin et al. |
| 5,152,463 A | 10/1992 | Mao et al. |
| 5,154,596 A | 10/1992 | Schwartz et al. |
| 5,195,884 A | 3/1993 | Schwartz et al. |
| 5,201,650 A | 4/1993 | Johnson |
| 5,224,851 A | 7/1993 | Johnson |
| 5,238,395 A | 8/1993 | Schwartz et al. |
| 5,254,325 A * | 10/1993 | Yamasaki et al. ............ 423/450 |
| 5,263,849 A | 11/1993 | Irwin et al. |
| 5,269,679 A | 12/1993 | Syska et al. |
| 5,275,554 A | 1/1994 | Faulkner |
| 5,284,438 A | 2/1994 | McGill et al. |
| 5,299,930 A | 4/1994 | Weidman |
| 5,316,469 A | 5/1994 | Martin et al. |
| 5,326,254 A | 7/1994 | Munk |
| 5,344,307 A | 9/1994 | Schwartz et al. |
| 5,350,293 A | 9/1994 | Khinkis et al. |
| 5,370,526 A | 12/1994 | Buschulte et al. |
| 5,407,345 A | 4/1995 | Robertson et al. |
| 5,413,477 A | 5/1995 | Moreland |
| 5,470,224 A | 11/1995 | Bortz |
| 5,472,341 A | 12/1995 | Meeks |
| 5,542,839 A | 8/1996 | Kelly |
| 5,562,438 A | 10/1996 | Gordon et al. |
| 5,584,684 A | 12/1996 | Dobbeling et al. |
| 5,603,906 A | 2/1997 | Lang et al. |
| 5,611,682 A | 3/1997 | Slavejkov et al. |
| 5,624,253 A | 4/1997 | Sulzhik et al. |
| 5,685,707 A * | 11/1997 | Ramsdell et al. ............ 431/90 |
| 5,688,115 A * | 11/1997 | Johnson ....................... 431/9 |
| 5,807,094 A | 9/1998 | Sarv |
| 5,813,846 A * | 9/1998 | Newby et al. ................ 431/9 |
| 5,980,243 A | 11/1999 | Surbey et al. |
| 5,984,665 A | 11/1999 | Loftus et al. |
| 5,987,875 A | 11/1999 | Hilburn et al. |
| 5,993,193 A | 11/1999 | Loftus et al. |
| 6,007,325 A | 12/1999 | Loftus et al. |
| 6,056,538 A | 5/2000 | Buchner et al. |
| 6,332,408 B2 * | 12/2001 | Howlett et al. ............. 110/189 |
| 6,347,935 B1 | 2/2002 | Schindler et al. |
| 6,383,462 B1 * | 5/2002 | Lang ....................... 423/235 |
| 6,616,442 B2 | 9/2003 | Venizelos et al. |

OTHER PUBLICATIONS

Seebold, James G., "Reduce Heater NOx in the Burner," *Hydrocarbon Processing*, Nov. 1982, pp. 183–186.

"West Germany's Caloric Develops a Low–NOx Recycling Fuel Burner," *Chemical Engineering*, Oct. 4, 1982, p. 17.

Chemical Engineering Progress, vol. 43, 1947, "The Design of Jet Pumps" by A. Edgar Kroll, pp. 21–24, vol. 1, No. 2.

* cited by examiner

BURNER EMPLOYING COOLED FLUE GAS RECIRCULATION

RELATED APPLICATIONS

This patent application claims priority from Provisional Application Ser. No. 60/365,146, filed on Mar. 16, 2002, the contents of which are hereby incorporated by reference.

FIELD OF THE INVENTION

This invention relates to an improvement in a burner such as those employed in high temperature furnaces in the steam cracking of hydrocarbons. More particularly, it relates to the use of cooled flue gas recirculation in a burner of novel configuration to achieve a reduction in $NO_x$ emissions.

BACKGROUND OF THE INVENTION

As a result of the interest in recent years to reduce the emission of pollutants from burners used in large industrial furnaces, burner design has undergone substantial change. In the past, improvements in burner design were aimed primarily at combustion efficiency and effective heat transfer. Increasingly stringent environmental regulations have shifted the focus of burner design to the minimization of regulated pollutants.

Oxides of nitrogen ($NO_x$) are formed in air at high temperatures. These compounds include, but are not limited to, nitrogen oxide and nitrogen dioxide. Reduction of $NO_x$ emissions is a desired goal to decrease air pollution and meet government regulations. In recent years, a wide variety of mobile and stationary sources of $NO_x$ emissions have come under increased scrutiny and regulation.

A strategy for achieving lower $NO_x$ emission levels is to install a $NO_x$ reduction catalyst to treat the furnace exhaust stream. This strategy, known as Selective Catalytic Reduction (SCR), is very costly and, although it can be effective in meeting more stringent regulations, represents a less desirable alternative to improvements in burner design.

Burners used in large industrial furnaces may use either liquid fuel or gas. Liquid fuel burners mix the fuel with steam prior to combustion to atomize the fuel to enable more complete combustion, and combustion air is mixed with the fuel in the zone of combustion.

Gas fired burners can be classified as either premix or raw gas, depending on the method used to combine the air and fuel. They also differ in configuration and the type of burner tip used.

Raw gas burners inject fuel directly into the air stream, and the mixing of fuel and air occurs simultaneously with combustion. Since airflow does not change appreciably with fuel flow, the air register settings of natural draft burners must be changed after firing rate changes. Therefore, frequent adjustment may be necessary, as explained in detail in U.S. Pat. No. 4,257,763. In addition, many raw gas burners produce luminous flames.

Premix burners mix some or all of the fuel with some or all of the combustion air prior to combustion. Since premixing is accomplished by using the energy present in the fuel stream, airflow is largely proportional to fuel flow. As a result, therefore, less frequent adjustment is required. Premixing the fuel and air also facilitates the achievement of the desired flame characteristics. Due to these properties, premix burners are often compatible with various steam cracking furnace configurations.

Floor-fired premix burners are used in many steam crackers and steam reformers primarily because of their ability to produce a relatively uniform heat distribution profile in the tall radiant sections of these furnaces. Flames are non-luminous, permitting tube metal temperatures to be readily monitored. Therefore, a premix burner is the burner of choice for such furnaces. Premix burners can also be designed for special heat distribution profiles or flame shapes required in other types of furnaces.

One technique for reducing $NO_x$ that has become widely accepted in industry is known as combustion staging. With combustion staging, the primary flame zone is deficient in either air (fuel-rich) or fuel (fuel-lean). The balance of the air or fuel is injected into the burner in a secondary flame zone or elsewhere in the combustion chamber. As is well known, a fuel-rich or fuel-lean combustion zone is less conducive to $NO_x$ formation than an air-fuel ratio closer to stoichiometry. Combustion staging results in reducing peak temperatures in the primary flame zone and has been found to alter combustion kinetics in a way that reduces $NO_x$. Since $NO_x$ formation is exponentially dependent on gas temperature, even small reductions in peak flame temperature can dramatically reduce $NO_x$ emissions. However this must be balanced with the fact that radiant heat transfer decreases with reduced flame temperature, while CO emissions, an indication of incomplete combustion, may actually increase as well.

In the context of premix burners, the term primary air refers to the air premixed with the fuel; secondary, and in some cases tertiary, air refers to the balance of the air required for proper combustion. In raw gas burners, primary air is the air that is more closely associated with the fuel; secondary and tertiary air are more remotely associated with the fuel. The upper limit of flammability refers to the mixture containing the maximum fuel concentration (fuel-rich) through which a flame can propagate.

One set of techniques achieves lower flame temperatures by diluting the fuel-air mixture with inert material. Flue gas (the products of the combustion reaction) or steam are commonly used diluents. Such burners are classified as FGR (flue-gas-recirculation) or steam-injected, respectively.

U.S. Pat. No. 4,004,875, the contents of which are incorporated by reference in their entirety, discloses a low $NO_x$ burner, in which combusted fuel and air is cooled and recirculated back into the combustion zone. The recirculated combusted fuel and air is formed in a zone with a deficiency of air.

U.S. Pat. No. 4,230,445 discloses a fluid fuel burner that reduces $NO_x$ emissions by supplying a flue gas/air mixture through several passages. Flue gas is drawn from the combustion chamber through the use of a blower. The contents of U.S. Pat. No. 4,230,445 are incorporated by reference in their entirety.

U.S. Pat. No. 4,575,332, the contents of which are incorporated by reference in their entirety, discloses a burner having both oil and gas burner lances, in which $NO_x$ emissions are reduced by discontinuously mixing combustion air into the oil or gas flame to decelerate combustion and lower the temperature of the flame.

U.S. Pat. No. 4,629,413 discloses a low $NO_x$ premix burner and discusses the advantages of premix burners and methods to reduce $NO_x$ emissions. The premix burner of U.S. Pat. No. 4,629,413 lowers $NO_x$ emissions by delaying the mixing of secondary air with the flame and allowing some cooled flue gas to recirculate with the secondary air. The contents of U.S. Pat. No. 4,629,413 are incorporated by reference in their entirety.

U.S. Pat. No. 4,708,638, the contents of which are incorporated by reference in their entirety, discloses a fluid fuel burner in which $NO_x$ emissions are reduced by lowering the flame temperature. A venturi in a combustion air supply passage, upstream of a swirler, induces the flow of flue gas into the combustion air supply passage from ducts opening into the furnace. A swirler is located at the free end of a fuel pipe and mixes the flue gas with the primary combustion air.

U.S. Pat. No. 5,092,761 discloses a method and apparatus for reducing $NO_x$ emissions from premix burners by recirculating flue gas. Flue gas is drawn from the furnace through a pipe or pipes by the aspirating effect of fuel gas and combustion air passing through a venturi portion of a burner tube. The flue gas mixes with combustion air in a primary air chamber prior to combustion to dilute the concentration of $O_2$ in the combustion air, which lowers flame temperature and thereby reduces $NO_x$ emissions. The flue gas recirculating system may be retrofitted into existing premix burners or may be incorporated in new low $NO_x$ burners. The contents of U.S. Pat. No. 5,092,761 are incorporated by reference in their entirety.

A drawback of the system of U.S. Pat. No. 5,092,761 is that the flue gas and air recirculation into the FGR can be as hot as 2100° F.

Despite these advances in the art, a need exists for a highly efficient burner design for industrial use to meet increasingly stringent $NO_x$ emission regulations.

Therefore, what is needed is a burner for the combustion of fuel wherein the temperature of the recirculated flue gas and the resultant fuel/air/flue-gas mixture is advantageously reduced without raising the oxygen content of the flue gas-air mixture. This would reduce the flame temperature and flame speed thereby resulting in a reduction of $NO_x$ formation.

SUMMARY OF THE INVENTION

The present invention is directed to a method and apparatus for use in burners in furnaces such as those used in steam cracking. The apparatus includes a burner tube having a downstream end, and having an upstream end for receiving fuel and air, flue gas or mixtures thereof, a burner tip mounted on the downstream end of the burner tube adjacent to a first opening in the furnace, so that combustion of the fuel takes place downstream of the burner tip, at least one passageway having a first end at a second opening in the furnace and a second end adjacent to the upstream end of the burner tube, means for drawing flue gas from the furnace through the passageway in response to an inspirating effect created by uncombusted fuel flowing through the burner tube from its upstream end towards its downstream end, and at least one tube disposed in the passageway wherein air that is cooler than the flue gas flows through the tube into a secondary air chamber permitting heat to be transferred from the flue gas to the air to create preheated air.

Also provided is a method for use in burners. The method includes the steps of combining fuel and air, flue gas or mixtures thereof at a predetermined location, combusting the fuel in a combustion zone downstream of the predetermined location, drawing a stream of flue gas from the furnace in response to the inspirating effect of uncombusted fuel flowing towards the combustion zone, the flue gas mixing with the air at the predetermined location upstream of the zone of combustion, exchanging heat between the flue gas and a portion of air thereby cooling the flue gas and heating the portion of the air to form a preheated air and a cooled flue gas, and directing the cooled flue gas to the predetermined location and mixing the cooled flue gas with fuel and air.

An object of the present invention is to provide a burner arrangement that permits the temperature of the recirculated flue gas as well as the temperature of the fuel/air/flue-gas mixture in the venturi to be reduced. Alternatively, the arrangement permits the use of higher FGR ratios at constant venturi temperature.

These and other objects and features of the present invention will be apparent from the detailed description taken with reference to accompanying drawings.

BRIEF DESCRIPTION OF THE DRAWINGS

The invention is further explained in the description that follows with reference to the drawings illustrating, by way of non-limiting examples, various embodiments of the invention wherein.

DETAILED DESCRIPTION OF THE ILLUSTRATED EMBODIMENTS

Figure 1:
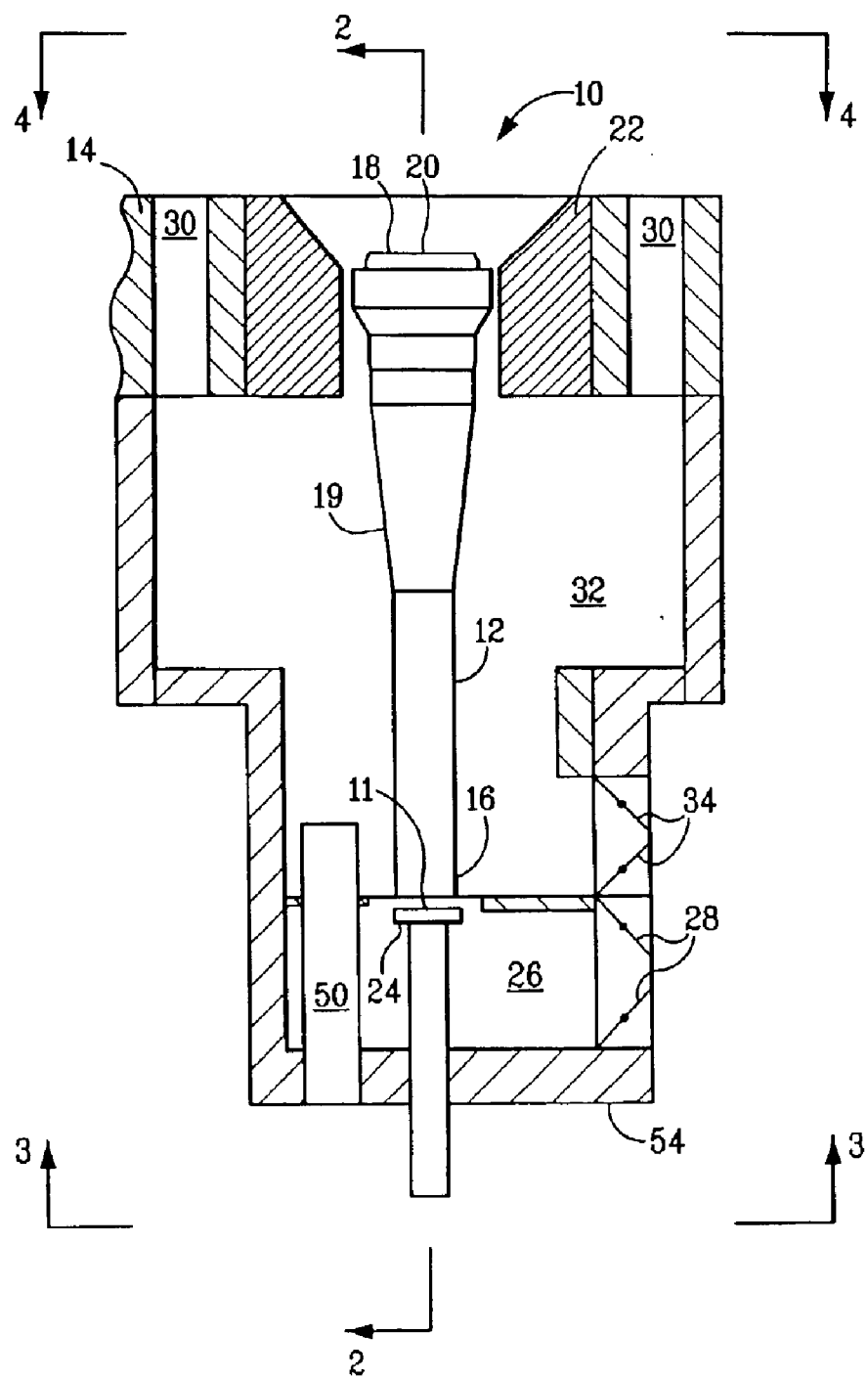
FIG. 1 illustrates an elevation partly in section of an embodiment of the premix burner of the present invention.

Reference is now made to the embodiments illustrated in FIGS. 1–10 wherein like numerals are used to designate like parts throughout.

Although the present invention is described in terms of a burner for use in connection with a furnace or an industrial furnace, it will be apparent to one of skill in the art that the teachings of the present invention also have applicability to other process components such as, for example, boilers. Thus, the term furnace herein shall be understood to mean furnaces, boilers and other applicable process components.

Referring now to FIGS. 1–4, a burner 10 includes a freestanding burner tube 12 located in a well in a furnace floor 14. Burner tube 12 includes an upstream end 16, a downstream end 18 and a venturi portion 19. Burner tip 20 is located at downstream end 18 and is surrounded by an annular tile 22. A fuel orifice 11, which may be located in gas spud 24, is located at upstream end 16 and introduces fuel into burner tube 12. Fresh or ambient air is introduced into primary air chamber 26 through adjustable damper 28 to mix with the fuel at upstream end 16 of burner tube 12. Combustion of the fuel and fresh air occurs downstream of the burner tip 20. Steam injection tube 15 may also be present to introduce steam as a diluent.

A plurality of staged air ports 30 originate in secondary air chamber 32 and pass through furnace floor 14 into the furnace. Fresh air enters secondary air chamber 32 through adjustable dampers 34 and passes through staged air ports 30 into the furnace to provide secondary or staged combustion.

In order to recirculate flue gas from the furnace to the primary air chamber, ducts or pipes 36, 38 extend from openings 40, 42, respectively, in the floor of the furnace to openings 44, 46, respectively, in burner 10. Flue gas containing, for example, from about 0 to 15% $O_2$ is drawn through pipes 36, 38 with about 5 to about 15% $O_2$ preferred about 2 to about 10% more preferred and about 2 to about 5% $O_2$ particularly preferred by the inspirating effect of fuel passing through venturi portion 19 of burner tube 12. In this manner, the primary air and flue gas are mixed in primary air chamber 26, which is prior to the zone of combustion. Therefore, the amount of inert material mixed with the fuel is raised, thereby reducing the flame temperature and, as a result, reducing $NO_x$ emissions. This is in contrast to a liquid fuel burner, such as that of U.S. Pat. No. 2,813,578, in which the combustion air is mixed with the fuel in the zone of combustion, rather than prior to the zone of combustion.

Closing or partially closing damper 28 restricts the amount of fresh air that can be drawn into the primary air chamber 26 and thereby provides the vacuum necessary to draw flue gas from the furnace floor.

Low temperature ambient air is drawn from a source of air through one or more FGR heat exchange tubes 62, disposed in each of the pipes 36, 38 into the secondary air chamber 32 by the draft in the furnace. The heat exchange tubes 62 are preferably round in cross section but other shapes have utility in the practice of the present invention. The ambient air may be fresh air as discussed above. Heat is transferred to the low temperature ambient air as it flows through the FGR heat exchange tubes 62 from the recirculated flue gas passing though the ducts or pipes 36, 38. This lowers the temperature of the hot flue gas flowing through pipes 36, 38 which allows this type burner to reduce NOx emissions as previously described especially in high temperature cracking furnaces having flue gas temperature above 1900° F. in the radiant section of the furnace.

Furthermore, this transfer of heat directly into the air entering the secondary air chamber will raise the temperature of the staged air so that there is no reduction in thermal efficiency of the burner compared, for example, to transferring the heat from the recirculated flue gas to the outside air.

The lower temperature in the FGR duct and venturi, resulting from the cooling of the recirculated flue gas, will raise the density of the gas mixture and raise the FGR entrainment capacity of the venturi. A higher capacity venturi will in turn beneficially raise the inspiration rate of the recirculated flue gas. The increased inspiration of recirculated flue gas decreases the oxygen content of the fuel air mixture and increases the heat capacity, both of which will help reduce the flame temperature, and reduce NOx formation even further.

The majority of the low temperature ambient air enters the secondary air chamber 32 through dampers 34. The ambient air may be fresh air.

A sight and lighting port 50 is provided in the burner 10, both to allow inspection of the interior of the burner assembly, and to provide access for lighting of the burner. The burner plenum may be covered with mineral wool and wire mesh screening 54 to provide insulation therefor.

Figure 5:
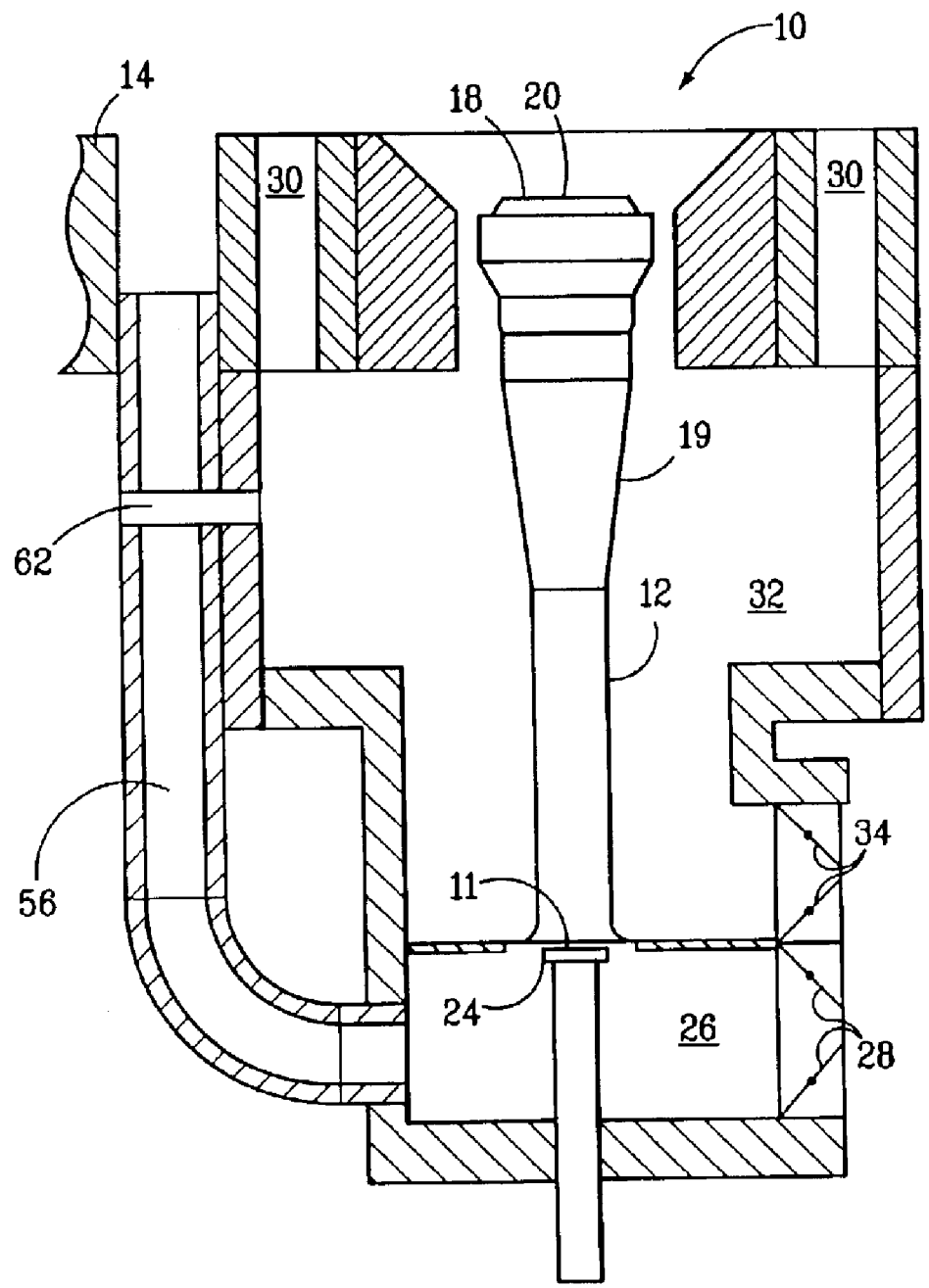
FIG. 5 is a second embodiment of the premix burner of the present invention.

An alternate embodiment of the burner of FIGS. 1–4 is shown in FIG. 5, wherein like reference numbers indicate like parts. As may be seen, the main difference between the embodiment of FIGS. 1–4, and that of FIG. 5, is that the latter employs only a single recirculation pipe 56. One or more staged air FGR heat exchange tubes 62 are provided in the single recirculation pipe 56. In this embodiment, for example, a single 6-inch diameter pipe is used to replace two 4-inch diameter pipes.

Figure 6:
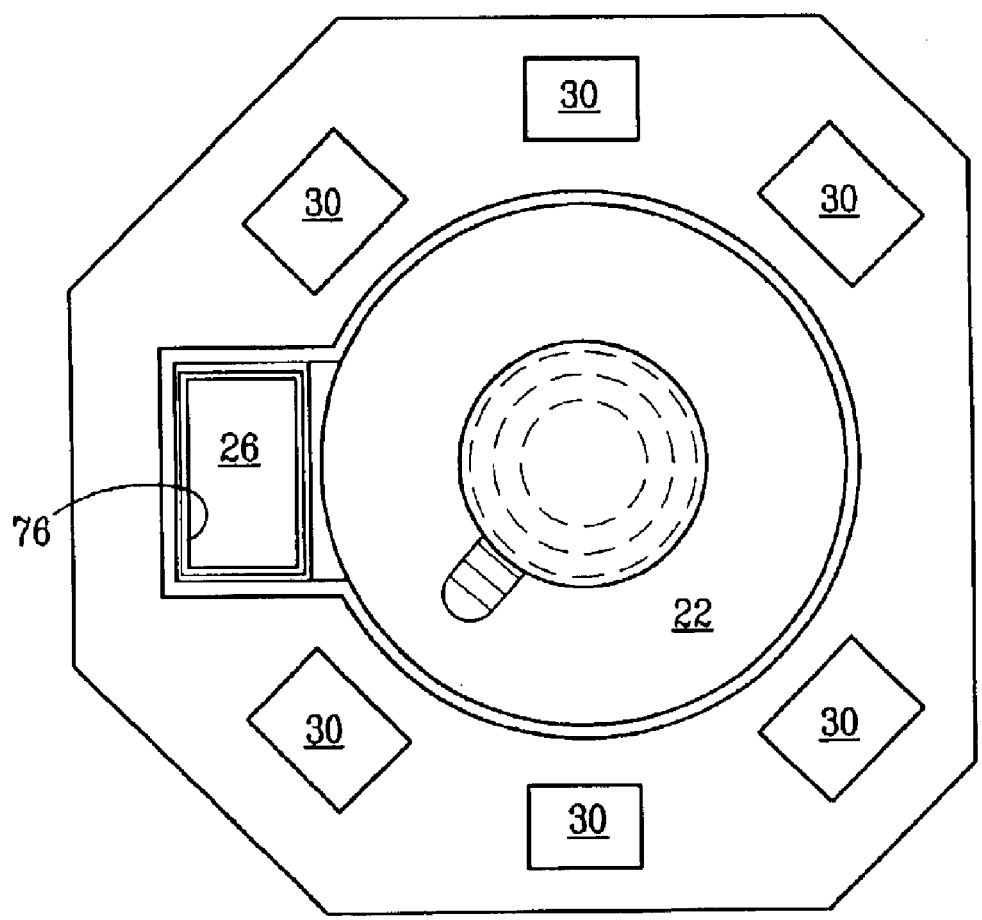
FIG. 6 is a plan view taken along line 6—6 of FIG. 7.
Figure 7:
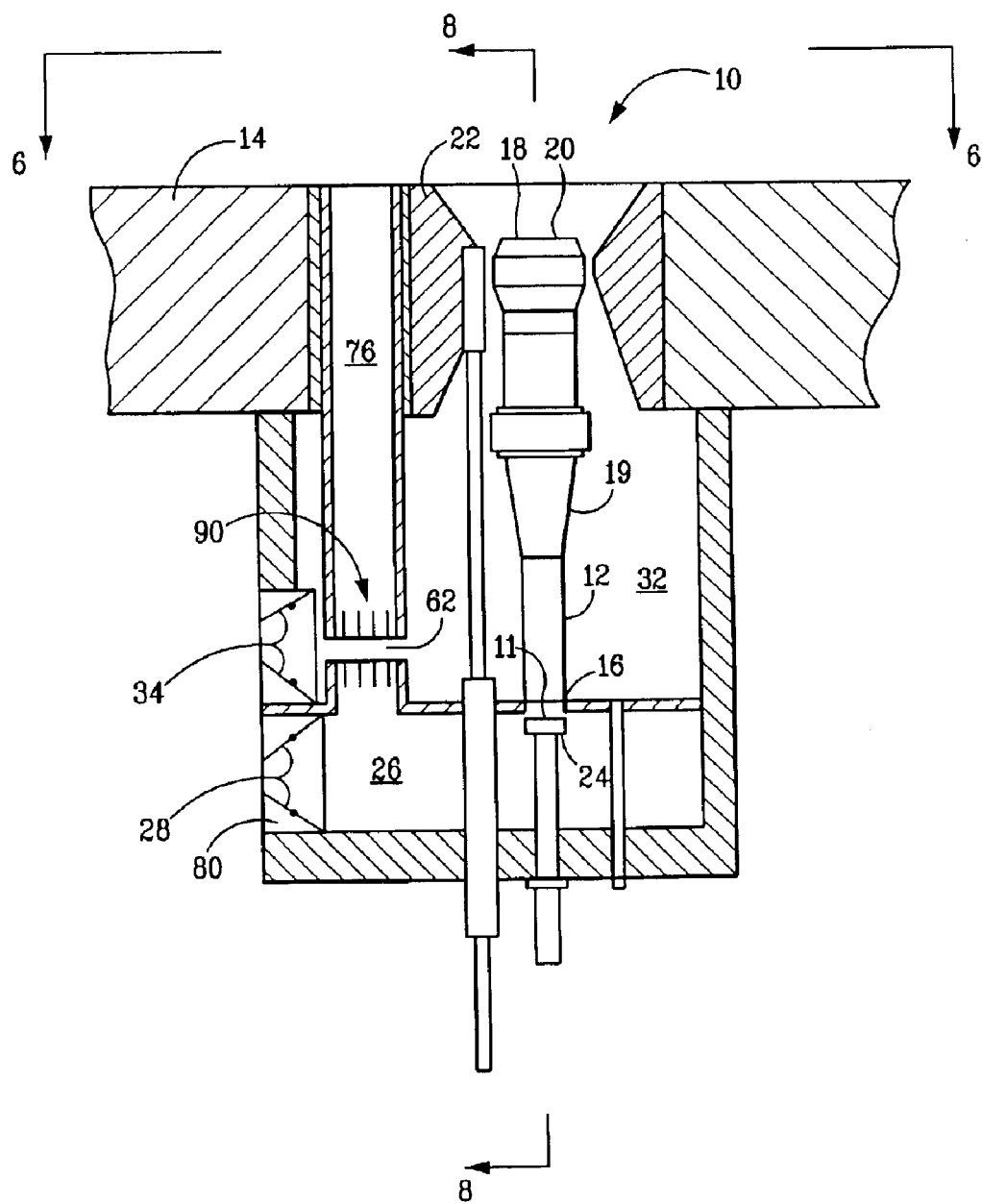
FIG. 7 is an elevation partly in section of a third embodiment of the premix burner of the present invention.
Figure 8:
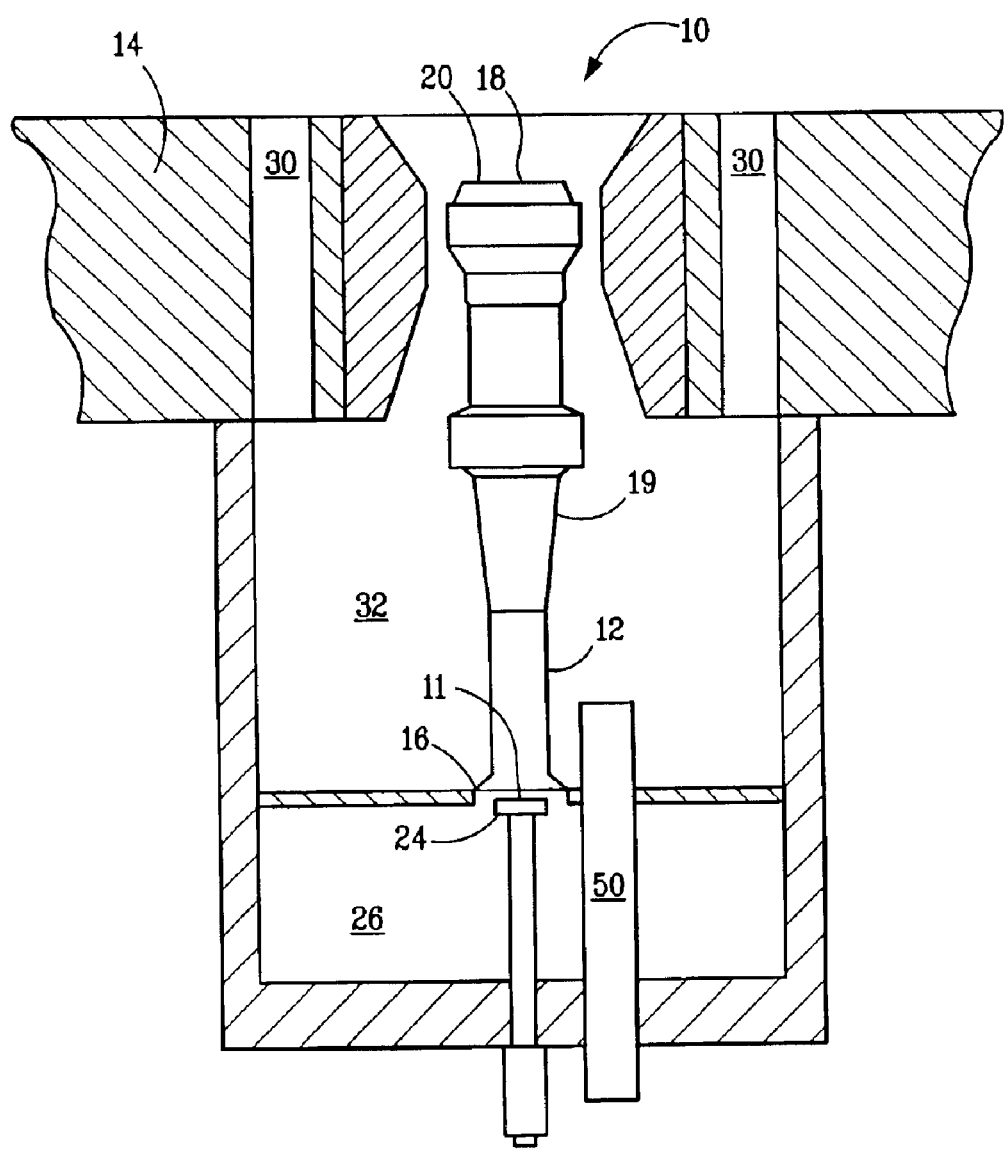
FIG. 8 is an elevation partly in section taken along line 8—8 of FIG. 7.

The improved flue gas recirculation system of the present invention may also be used in a low $NO_x$ burner design of the type illustrated in FIGS. 6–8, wherein like reference numbers indicate like parts. As with the embodiment of FIGS. 1–4, a premix burner 10 includes a freestanding burner tube 12 located in a well in a furnace floor 14. Burner tube 12 includes an upstream end 16, a downstream end 18 and a venturi portion 19. Burner tip 20 is located at downstream end 18 and is surrounded by an annular tile 22. A fuel orifice 11, which may be located in gas spud 24 is located at upstream end 16 and introduces fuel into burner tube 12. Fresh or ambient air is introduced into primary air chamber 26 through adjustable damper 28 to mix with the fuel at upstream end 16 of burner tube 12. Combustion of the fuel and fresh air occurs downstream of the burner tip 20.

A plurality of air ports 30 originates in secondary air chamber 32 and pass through furnace floor 14 into the furnace. Fresh air enters secondary air chamber 32 through adjustable dampers 34 and passes through staged air ports 30 into the furnace to provide secondary or staged combustion.

In order to recirculate flue gas from the furnace to the primary air chamber, a flue gas recirculation passageway 76 is formed in furnace floor 14 and extends to primary air chamber 26, so that flue gas is mixed with fresh air drawn into the primary air chamber from opening 80. Flue gas containing, for example, about 0 to about 15% $O_2$ is drawn through passageway 76 by the inspirating effect of fuel passing through venturi portion 19 of burner tube 12. As with the embodiment of FIGS. 1–4, the primary air and flue gas are mixed in primary air chamber 26, which is prior to the zone of combustion. Closing or partially closing damper 28 restricts the amount of fresh air that can be drawn into the primary air chamber 26 and thereby provides the vacuum necessary to draw flue gas from the furnace floor.

As shown, low temperature ambient air can enter the secondary air chamber 32 through dampers 34. Again, the ambient air may be fresh air as discussed above. One or more FGR heat exchange tubes 62 are provided in the flue gas recirculation passageway 76 which allow the low temperature ambient air to exchange heat with the recirculated flue gas. Advantageously, FGR heat exchange tubes 62 may be provided with a plurality of fins 90 positioned about an outer surface thereof for contacting flue gas flowing through the flue gas recirculation passageway 76.

Sight and lighting port 50 provides access to the interior of burner 10 for inspection and lighting element.

Figure 9:
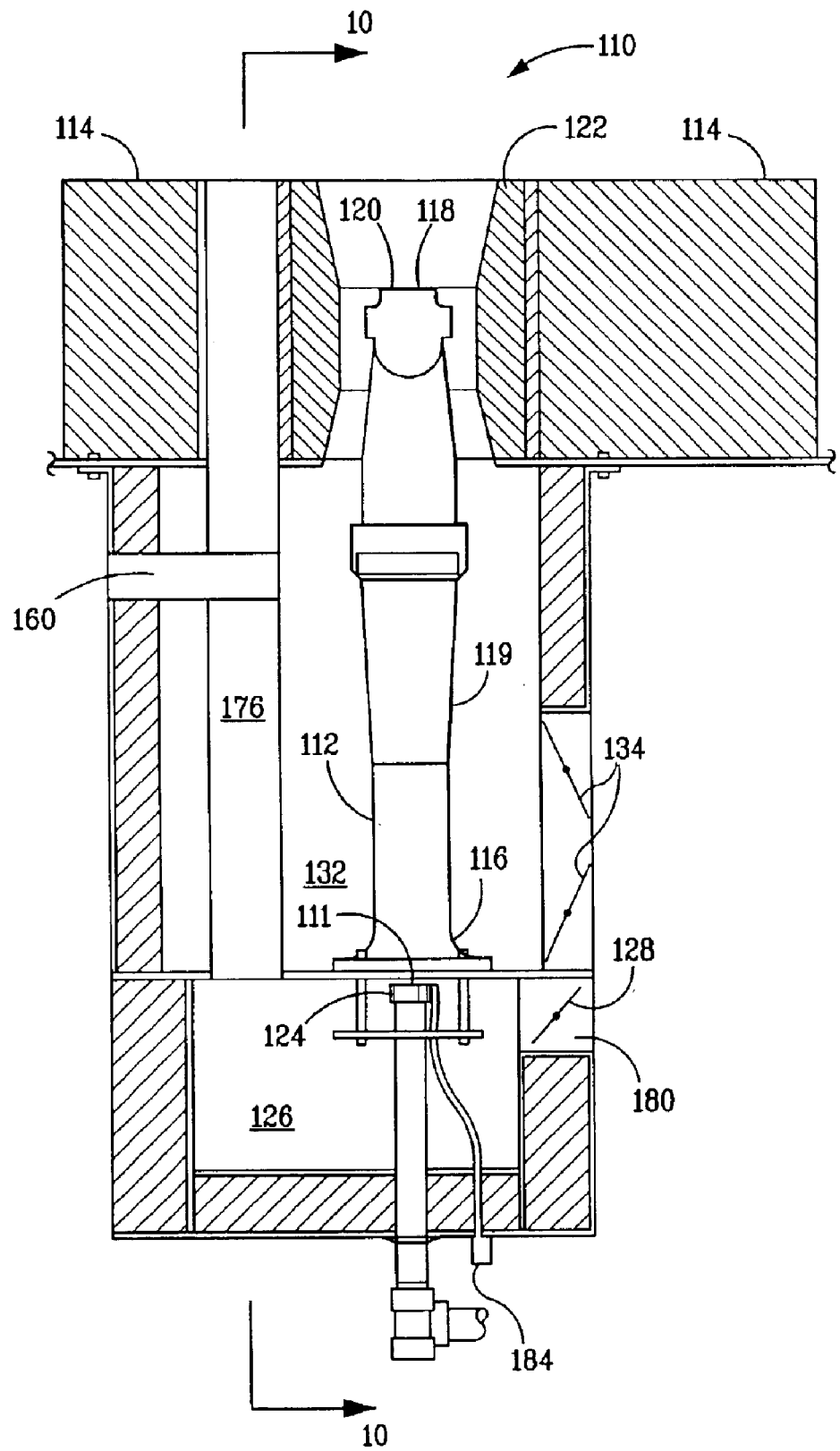
FIG. 9 illustrates an elevation partly in section of an embodiment of a flat-flame burner of the present invention.
Figure 10:
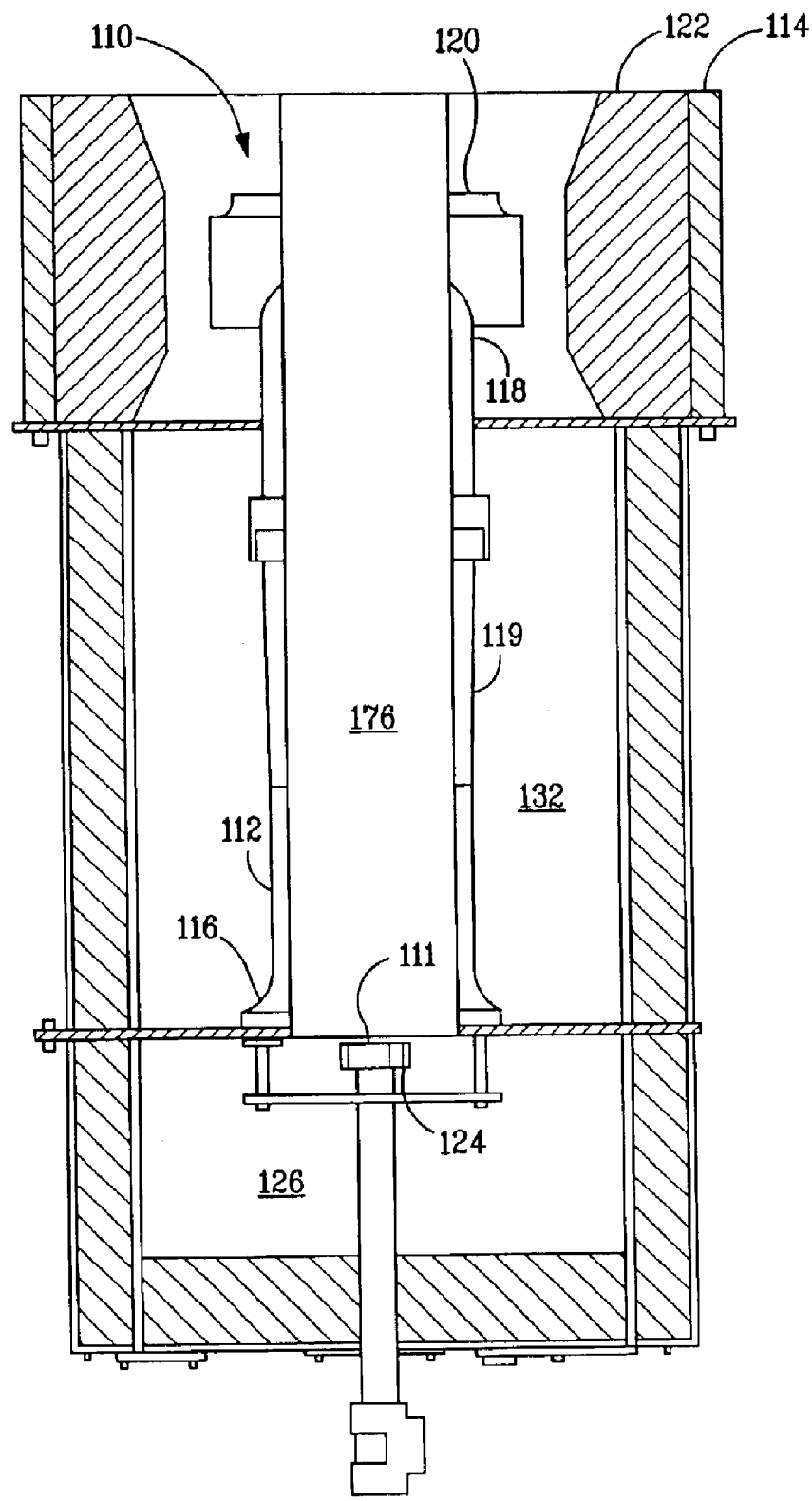
FIG. 10 is an elevation partly in section of the embodiment of a flat-flame burner of FIG. 9 taken along line 10—10 of FIG. 9.

The FGR heat exchange tubes of the present invention may be employed in flat-flame burners, as will now be described by reference to FIGS. 9 and 10. A premix burner 110 includes a freestanding burner tube 112 located in a well in a furnace floor 114. Burner tube 112 includes an upstream end 116, a downstream end 118 and a venturi portion 119. Burner tip 120 is located at downstream end 118 and is surrounded by an annular tile 122. A fuel orifice 111, which may be located in gas spud 124 is located at upstream end 116 and introduces fuel gas into burner tube 112. Fresh or ambient air is introduced into primary air chamber 126 to mix with the fuel gas at upstream end 116 of burner tube 112. Combustion of the fuel gas and fresh air occurs downstream of the burner tip 120. Fresh secondary air enters secondary chamber 132 through dampers 134.

In order to recirculate flue gas from the furnace to the primary air chamber, a flue gas recirculation passageway 176 is formed in furnace floor 114 and extends to primary air chamber 126, so that flue gas is mixed with fresh air drawn into the primary air chamber from opening 180 through dampers 128. Flue gas containing, for example, about 0 to about 15% $O_2$ is drawn through passageway 176 by the inspirating effect of fuel passing through venturi portion 119 of burner tube 112. Primary air and flue gas are mixed in primary air chamber 126, which is prior to the zone of combustion.

Low temperature ambient air is drawn through one or more FGR heat exchange tubes 160 into the secondary air chamber 132.

As may be appreciated from the foregoing, a feature of the burner of the present invention is that the flue-gas recirculated to the burner is cooled by a portion of the cool secondary air. This reduces the temperature of the stream flowing out of the FGR duct. This feature is particularly important for the burners of high temperature furnaces such as steam crackers or reformers, where the temperature of the flue-gas being recirculated can be as high as 2100° F.

Analysis of burners of the type described in U.S. Pat. No. 5,092,761 has indicated the flue-gas-recirculation (FGR) ratio is generally in the range 5–10% where FGR ratio is defined as:

$$FGR \text{ ratio } (\%) = 100[G/(F+A)]$$

where G=Flue-gas drawn into venturi, (lb)
F=Fuel combusted in burner, (lb), and
A=Air drawn into burner, (lb).

For example, for a 10% FGR case with a mixture of 50% flue gas and 50% ambient air passing through the flue gas recirculation passageway, the maximum potential reduction in the recirculated flue gas temperature is as follows:

| % of total combustion air flowing through FGR heat exchange tubes | Maximum temperature reduction of recirculated flue gas, ° F. |
|---|---|
| 1.7 | 77 |
| 8.3 | 230 |
| 16.0 | 437 |
| 100.0 | 900 |

Figure 2:
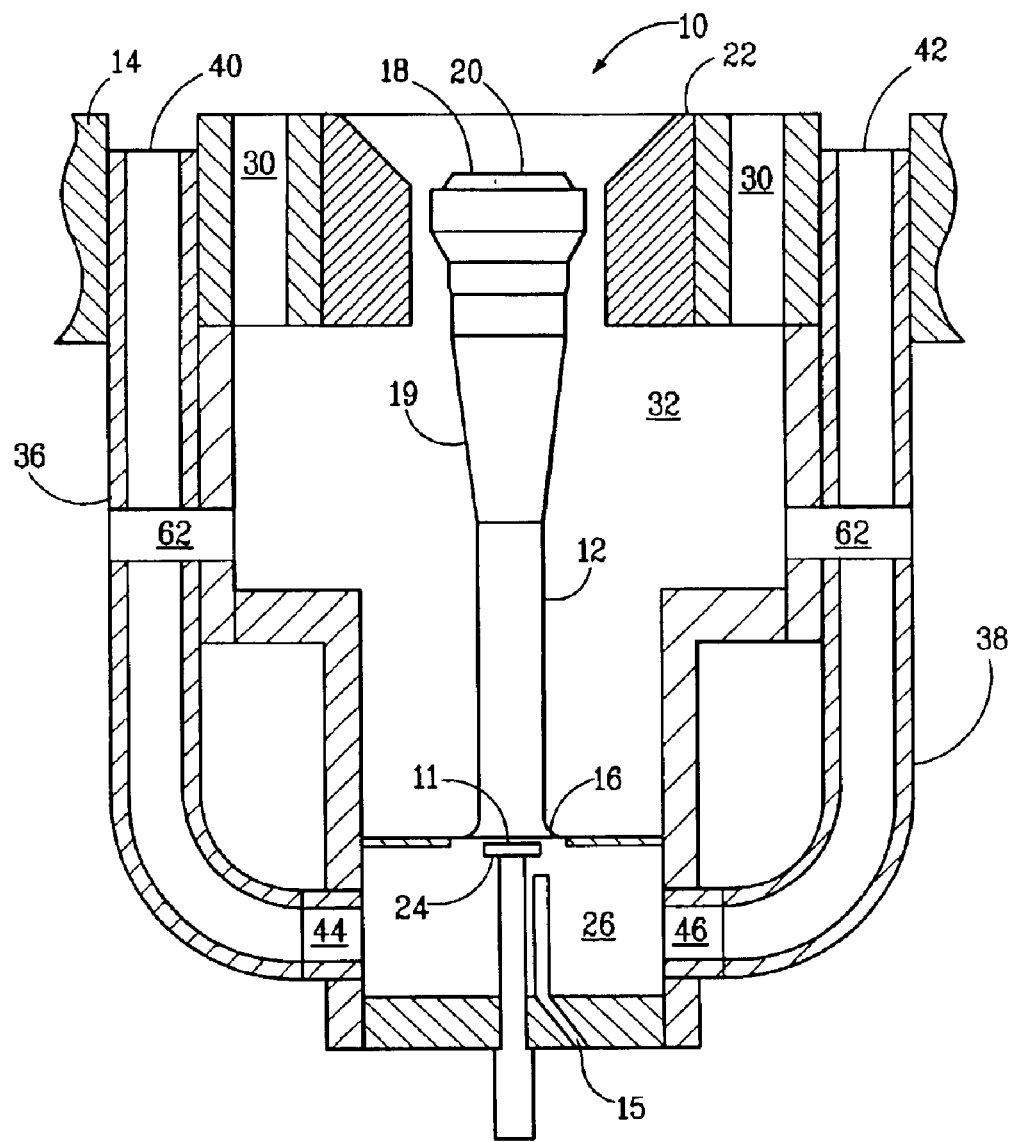
FIG. 2 is an elevation partly in section taken along line 2—2 of FIG. 1.
Figure 3:
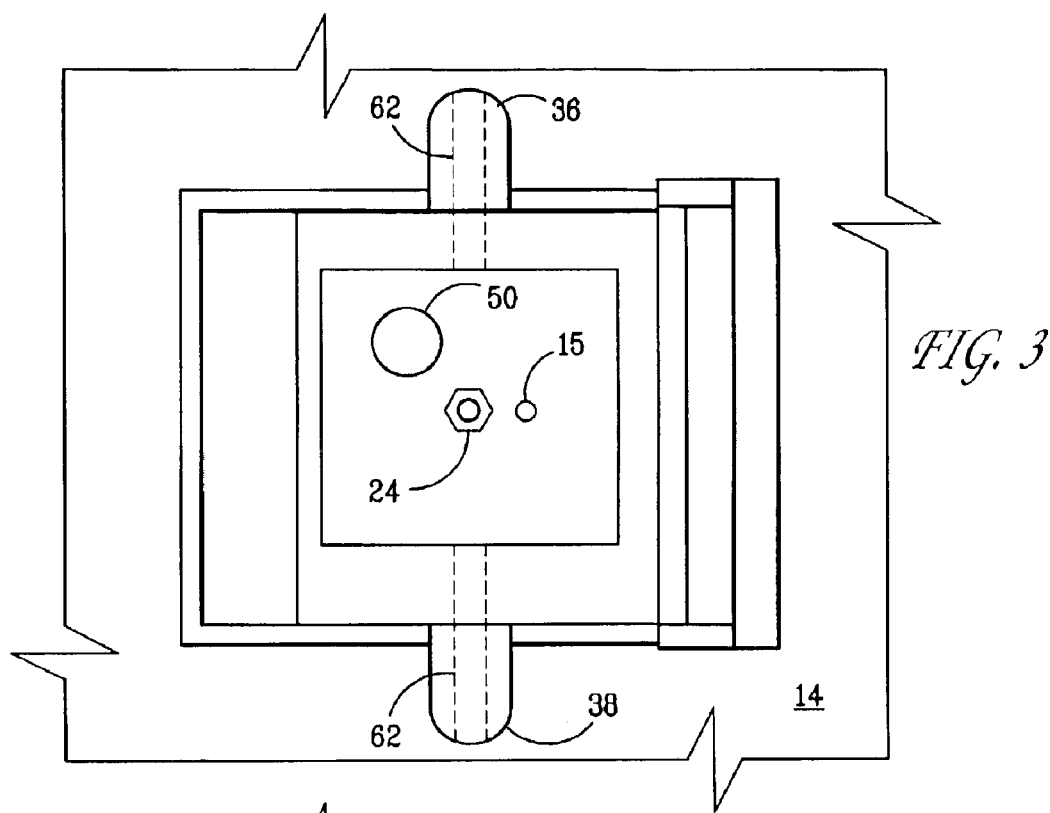
FIG. 3 is a plan view taken along line 3—3 of FIG. 1.
Figure 4:
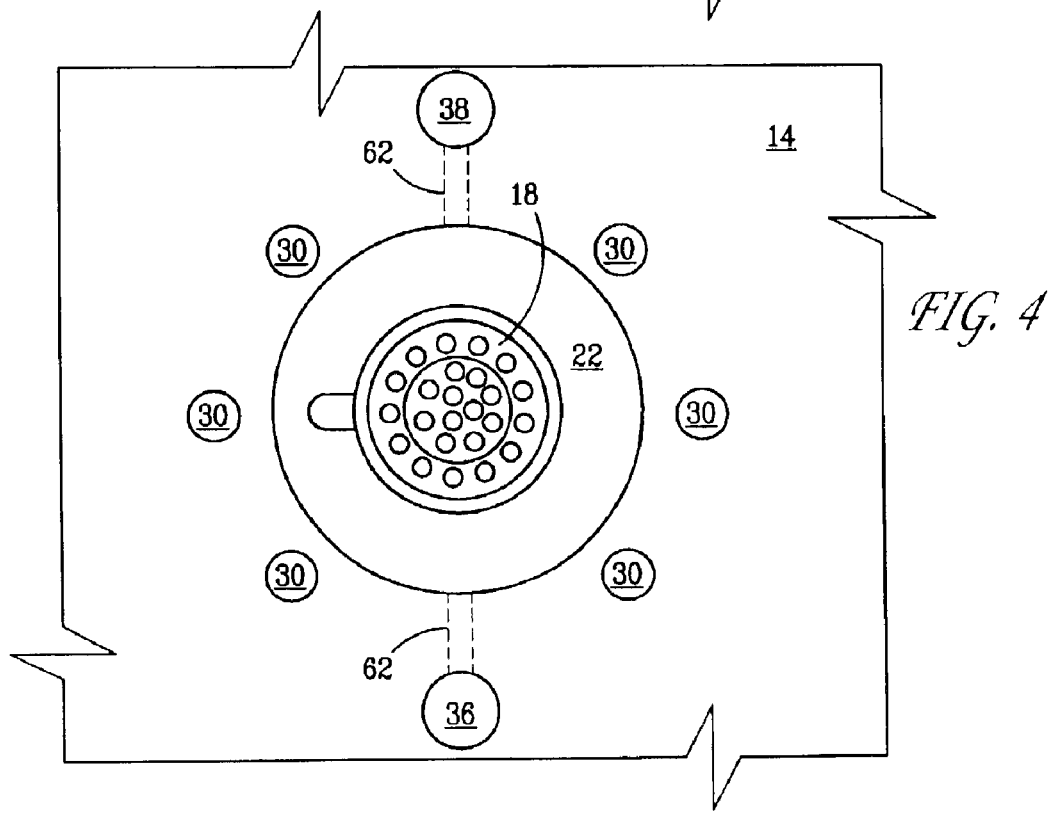
FIG. 4 is a plan view taken along line 4—4 of FIG. 1.

In addition to the use of flue gas as a diluent, another technique to achieve lower flame temperature through dilution is through the use of steam injection. Steam can be injected in the primary air or the secondary air chamber. Steam injection may occur through, for example, steam injection tube 15, as shown in FIG. 2 or steam injection tube 184, as shown in FIG. 9. Preferably, steam may be injected upstream of the venturi.

It will also be understood that the teachings described herein also have utility in traditional raw gas burners and raw gas burners having a pre-mix burner configuration wherein flue gas alone is mixed with fuel gas at the entrance to the burner tube. In fact, it has been found that the pre-mix, staged-air burners of the type described in detail herein can be operated with the primary air damper doors closed, with very satisfactory results.

As may be appreciated by those skilled in the art, the present invention can be incorporated in new burners or can be retrofitted into existing burners by alterations to the burner.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A burner for the combustion of fuel in a furnace, said burner comprising:

(a) a burner tube having a downstream end, and having an upstream end for receiving fuel and air, flue gas and mixtures thereof, a burner tip being mounted on the downstream end of said burner tube adjacent to a first opening in the furnace, so that combustion of the fuel takes place downstream of said burner tip;

(b) at least one passageway having a first end at a second opening in the furnace and a second end adjacent to the upstream end of said burner tube;

(c) means for drawing flue gas from said furnace through said passageway in response to an inspirating effect created by uncombusted fuel flowing through said burner tube from its upstream end towards its downstream end; and (d) at least one tube disposed in said passageway wherein air which is cooler than the flue gas flows through said at least one tube into a secondary air chamber permitting heat to be transferred from the flue gas to the air to create preheated air.

2. The burner according to claim 1, further comprising:

(e) at least one second passageway having a first end at a third opening in said furnace and a second end in said secondary air chamber and in fluid communication with said furnace permitting said preheated air to enter said furnace.

3. The burner according to claim 1, wherein said means for drawing flue gas from said furnace comprises a venturi portion in said burner tube.

4. The burner according to claim 1, further comprising at least one steam injection tube.

5. The burner according to claim 3, further comprising a primary air chamber, including at least one adjustable damper opening into said primary air chamber to restrict the amount of air entering into said primary air chamber, thereby providing a vacuum to draw flue gas from the furnace.

6. The burner according to claim 1, further comprising at least one opening into said secondary air chamber permitting air to enter said secondary air chamber.

7. The burner according to claim 6, wherein said at least one opening into said secondary air chamber includes at least one adjustable damper to restrict the amount of air entering said secondary air chamber.

8. The burner according to claim 1 wherein the air that is cooler than the flue gas is ambient air.

9. The burner according to claim 7, wherein the burner is a premix burner.

10. The burner according to claim 2, wherein the burner is a premix burner.

11. The burner according to claim 1, wherein the burner is a flat-flame burner.

12. The burner according to claim 9, further comprising a fuel orifice located adjacent the upstream end of said burner tube, for introducing fuel into said burner tube.

13. The burner according to claim 12 wherein said fuel orifice is located within a gas spud.

14. The burner according to claim 1, further comprising a fuel orifice located adjacent the upstream end of said burner tube, for introducing fuel into said burner tube.

15. The burner according to claim 14 wherein said fuel orifice is located within a gas spud.

16. The burner according to claim 14, wherein said means for drawing flue gas from said furnace through said at least one passageway in response to said inspirating effect is created by uncombusted fuel exiting the fuel orifice.

17. The burner according to claim 12 wherein said means for drawing flue gas from said furnace through said at least one passageway in response to said inspirating effect is created by uncombusted fuel exiting the fuel orifice.

18. The burner according to claim 1, wherein said at least one tube disposed in said passageway includes a plurality of fins positioned about an outer surface thereof for contacting flue gas flowing through said passageway.

19. A method for combusting fuel in a burner of a furnace, comprising:
   (a) combining fuel and air, flue gas or mixtures thereof at a predetermined location;
   (b) combusting the fuel in a combustion zone downstream of the predetermined location;
   (c) drawing a stream of flue gas from the furnace in response to the inspirating effect of uncombusted fuel flowing towards said combustion zone, the flue gas mixing with the air at the predetermined location upstream of the zone of combustion;
   (d) exchanging heat between the flue gas and a portion of air thereby cooling the flue gas and heating the portion of the air to form a preheated air and a cooled flue gas; and
   (e) directing the cooled flue gas to the predetermined location and mixing the cooled flue gas with fuel and air.

20. The method of claim 19, further comprising the step of:
   (f) flowing the preheated air to a location near the combustion zone to provide a staged-air combustion zone.

21. The method of claim 19, said step of drawing a stream of flue gas from the furnace in response to the inspirating effect of uncombusted fuel is created by the uncombusted fuel exiting a fuel orifice and flowing towards the combustion zone.

22. The method of claim 21, wherein said fuel orifice is located within a gas spud.

23. The method of claim 21, wherein said drawing step includes passing the fuel and air through a venturi, whereby the inspirating effect of the uncombusted fuel exiting the fuel orifice and flowing through said venturi draws the flue gas from the furnace.

24. The method of claim 23, wherein the burner is a premix burner.

25. The method of claim 20, wherein the burner is a premix burner.

26. The method of claim 23, wherein the burner is a flat flame burner.

27. The method of claim 20, wherein the burner is a flat flame burner.

28. The method of claim 26, wherein the furnace is a steam cracking furnace.

29. The method of claim 25, wherein the furnace is a steam cracking furnace.

30. The method of claim 24, wherein the furnace is a steam cracking furnace.

31. The method of claim 23, wherein the furnace is a steam cracking furnace.

32. The method of claim 20, wherein the furnace is a steam cracking furnace.

33. The method of claim 19, wherein the at least one tube disposed in the passageway includes a plurality of fins positioned about an outer surface thereof for contacting flue gas flowing through the passageway.

* * * * *